(12) United States Patent
Jacobson et al.

(10) Patent No.: US 10,787,263 B2
(45) Date of Patent: Sep. 29, 2020

(54) MANUAL LOCKING STUD FOR AIRCRAFT SEAT (71) Applicant: GOODRICH CORPORATION, Charlotte, NC (US)

(72) Inventors: Rob Jacobson, Marinette, WI (US); Vincent Michael Bournonville, Peshtigo, WI (US)

(73) Assignee: GOODRICH, Charlotte, NC (US)

( * ) Notice: Subject to any disclaimer, the term of this patent is extended or adjusted under 35 U.S.C. 154(b) by 0 days.

(21) Appl. No.: 15/926,144

(22) Filed: Mar. 20, 2018

(65) Prior Publication Data

US 2019/0291871 A1 Sep. 26, 2019

(51) Int. Cl.
*B64D 11/06* (2006.01)
*B60N 2/015* (2006.01)
*B60N 2/08* (2006.01)
*B60N 2/07* (2006.01)

(52) U.S. Cl.
CPC ...... *B64D 11/0696* (2013.01); *B60N 2/01575* (2013.01); *B60N 2/0806* (2013.01); *B60N 2/0818* (2013.01); *B64D 11/0648* (2014.12); *B60N 2/0715* (2013.01); *B60N 2/0732* (2013.01)

(58) Field of Classification Search
CPC ............ B64D 11/0696; B60N 2/01575; B60N 2/0806; B60N 2/0818; B60N 2/0715; B60N 2/0732
See application file for complete search history.

(56) References Cited

U.S. PATENT DOCUMENTS

| | | | | |
|---|---|---|---|---|
| 4,230,432 A | * | 10/1980 | Howell | B60P 7/0815 248/503.1 |
| 4,449,875 A | * | 5/1984 | Brunelle | B64D 11/0696 244/118.5 |
| 4,911,381 A | * | 3/1990 | Cannon | B64D 11/0696 244/122 R |
| 5,169,091 A | * | 12/1992 | Beroth | B64D 9/003 244/118.1 |
| 5,178,346 A | * | 1/1993 | Beroth | B64D 9/003 244/118.1 |
| 5,871,318 A | * | 2/1999 | Dixon | B60N 2/01558 244/118.1 |
| 7,665,939 B1 | * | 2/2010 | Cardona | B60P 7/0815 410/104 |
| 7,713,009 B2 | | 5/2010 | Hudson et al. | |

(Continued)

FOREIGN PATENT DOCUMENTS

EP 0200511 11/1986

OTHER PUBLICATIONS

European Patent Office, European Search Report dated Aug. 22, 2019 in Application No. 19163159.7.

*Primary Examiner* — Nkeisha Smith
(74) *Attorney, Agent, or Firm* — Snell & Wilmer L.L.P.

(57) ABSTRACT

A seat assembly for an aircraft is disclosed. The seat assembly includes a seat frame, a track and a track lock assembly slidably connecting the seat frame to the track. The track lock assembly includes a track foot body configured for sliding translation within the track, a pin member having a first end configured for threaded engagement with the track foot body and a second end, and a plunger configured for sliding engagement with the pin member between the first end and the second end and for locking engagement with the track lock assembly.

8 Claims, 9 Drawing Sheets

(56) References Cited

U.S. PATENT DOCUMENTS

| | | | |
|---|---|---|---|
| 7,785,053 B2 | 8/2010 | Hudson | |
| 7,975,979 B2 * | 7/2011 | Bishop | B60P 7/0815 |
| | | | 244/118.6 |
| 8,035,956 B2 | 10/2011 | Davison | |
| 8,128,326 B2 * | 3/2012 | Hudson | B64D 11/0696 |
| | | | 410/104 |
| 8,292,224 B1 | 10/2012 | Ahad et al. | |
| 8,899,545 B2 * | 12/2014 | Blees | B64D 9/00 |
| | | | 244/118.1 |
| 9,284,056 B2 * | 3/2016 | Mejuhas | B64D 11/0696 |
| 9,546,000 B2 * | 1/2017 | Shih | B64D 11/0696 |
| 9,663,232 B1 * | 5/2017 | Porter | B64D 11/0696 |
| 9,856,903 B2 * | 1/2018 | Bouchenoire | B60N 2/01558 |
| 9,868,416 B2 | 1/2018 | Rajasingham | |
| 9,919,803 B2 * | 3/2018 | Pozzi | B64D 11/0636 |
| 10,005,558 B2 * | 6/2018 | Cailleteau | A47B 91/08 |
| 10,189,375 B2 * | 1/2019 | Stubbe | B64D 11/0696 |
| 10,351,023 B2 * | 7/2019 | Hoshide | |
| 2007/0122254 A1 * | 5/2007 | LaConte | B64D 11/0696 |
| | | | 411/551 |
| 2008/0191115 A1 | 8/2008 | Stubbe | |
| 2010/0001546 A1 * | 1/2010 | Christensen | B64D 11/0696 |
| | | | 296/65.13 |
| 2010/0124457 A1 | 5/2010 | Cook et al. | |
| 2014/0202824 A1 * | 7/2014 | Esser | B60R 11/00 |
| | | | 193/37 |
| 2015/0047197 A1 * | 2/2015 | Deloubes | B64D 11/0696 |
| | | | 29/897.2 |
| 2016/0194085 A1 | 7/2016 | Stubbe | |
| 2019/0031355 A1 * | 1/2019 | Aury | B64D 11/0696 |
| 2019/0144119 A1 * | 5/2019 | Danet | F16B 2/02 |

* cited by examiner

MANUAL LOCKING STUD FOR AIRCRAFT SEAT

FIELD

The present disclosure relates generally to seating assemblies for aircraft and, more particularly, to track fitting locking stud devices used for securing a seating assembly to an aircraft.

BACKGROUND

Seating assemblies for aircraft are typically provided with a mechanism to lock the aircraft seat within a longitudinal track. The mechanism generally includes a pin or bolt that extends into the longitudinal track. A tight fit between the pin or bolt and a locking feature may be difficult to maintain over time or following repeated use, or may be intentionally avoided by design for ease of installation. A loose fit between the pin or bolt and the locking feature may result in undesirable play or movement within a joint formed by the mechanism and the longitudinal track. Further, such mechanisms are generally tightened using tools, such as wrenches or screwdrivers.

SUMMARY

A seat assembly is disclosed. In various embodiments, the seat assembly includes a seat frame, a track assembly and a track lock assembly slidably connecting the seat frame to the track assembly. In various embodiments, the track lock assembly includes a track foot body configured for sliding translation within the track assembly, a pin member having a first end configured for threaded engagement with the track foot body, a second end and a plunger configured for sliding engagement with the pin member between the first end and the second end and for locking engagement with the track lock assembly.

In various embodiments, the track assembly includes a plurality of access openings configured to receive the plunger. In various embodiments, the track foot body includes an anchor section configured to slidably receive the plunger and an aperture configured to receive the first end of the pin member. In various embodiments, the first end of the pin member is threaded into the anchor section of the track foot body. In various embodiments, the track lock assembly further comprises a bias element positioned between the anchor section and the plunger, the bias element configured to urge the plunger away from the anchor section. In various embodiments, the bias element is a coil spring and the pin member extends through a center of the coil spring.

In various embodiments, the track lock assembly includes a first nut threaded onto the pin member and configured to lock the plunger into one of the plurality of access openings. In various embodiments, the track lock assembly includes a second nut threaded onto the pin member and configured to jam lock the first nut. In various embodiments, the first nut and the second nut include a knurled surface configured for threading both the first nut and the second nut along the pin member by hand.

In various embodiments, the track lock assembly includes a locking collar positioned between the second end of the pin member and the plunger. In various embodiments, the locking collar includes a first hole and the plunger includes a tab member having a second hole and the locking collar and the tab member are configured to align the first hole and the second hole to receive a retaining clip.

In various embodiments, the track lock assembly includes a cam member pivotally attached to the second end of the pin member at a pivot point. In various embodiments, the cam member includes a locking face spaced an offset distance from the pivot point and configured to provide a downward push to the plunger when rotated from an upright position to a downward position. In various embodiments, the track lock assembly further includes a retaining clip and the cam member includes a hole configured to receive the retaining clip to lock the cam member in place when the cam member is rotated to the downward position.

A track lock assembly configured to secure a seat frame to a track is disclosed. In various embodiments, the track lock assembly includes a track foot body, a pin member having a first end secured to the track foot body and a second end extending away from the track foot body and a plunger slidably engaged with the pin member between the first end and the second end, the plunger having a cut out portion defining a first pair of opposing walls configured to slidably engage the track foot body.

In various embodiments, the first end of the pin member is threadedly engaged with the track foot body. In various embodiments, the track lock assembly includes a coil spring disposed between the track foot body and the plunger. In various embodiments, the track lock assembly includes a releasable lock device configured to lock the plunger into an access opening of the track. In various embodiments, the releasable lock device includes a first nut threaded onto the pin member and configured to releasably lock the plunger into the access opening and a second nut threaded onto the pin member and configured to jam lock the first nut. In various embodiments, the releasable lock device includes a cam member pivotally attached to the second end of the pin member at a pivot point and the cam member includes a locking face spaced an offset distance from the pivot point and configured to provide a downward push to the plunger when rotated from an upright position to a downward position.

BRIEF DESCRIPTION OF THE DRAWINGS

The subject matter of the present disclosure is particularly pointed out and distinctly claimed in the concluding portion of the specification. A more complete understanding of the present disclosure, however, may best be obtained by referring to the following detailed description and claims in connection with the following drawings. While the drawings illustrate various embodiments employing the principles described herein, the drawings do not limit the scope of the claims.

DETAILED DESCRIPTION

The following detailed description of various embodiments herein makes reference to the accompanying drawings, which show various embodiments by way of illustration. While these various embodiments are described in sufficient detail to enable those skilled in the art to practice the disclosure, it should be understood that other embodiments may be realized and that changes may be made without departing from the scope of the disclosure. Thus, the detailed description herein is presented for purposes of illustration only and not of limitation. Furthermore, any reference to singular includes plural embodiments, and any reference to more than one component or step may include a singular embodiment or step. Also, any reference to attached, fixed, connected, or the like may include permanent, removable, temporary, partial, full or any other possible attachment option. Additionally, any reference to without contact (or similar phrases) may also include reduced contact or minimal contact. It should also be understood that unless specifically stated otherwise, references to "a," "an" or "the" may include one or more than one and that reference to an item in the singular may also include the item in the plural. Further, all ranges may include upper and lower values and all ranges and ratio limits disclosed herein may be combined.

Figure 1A:
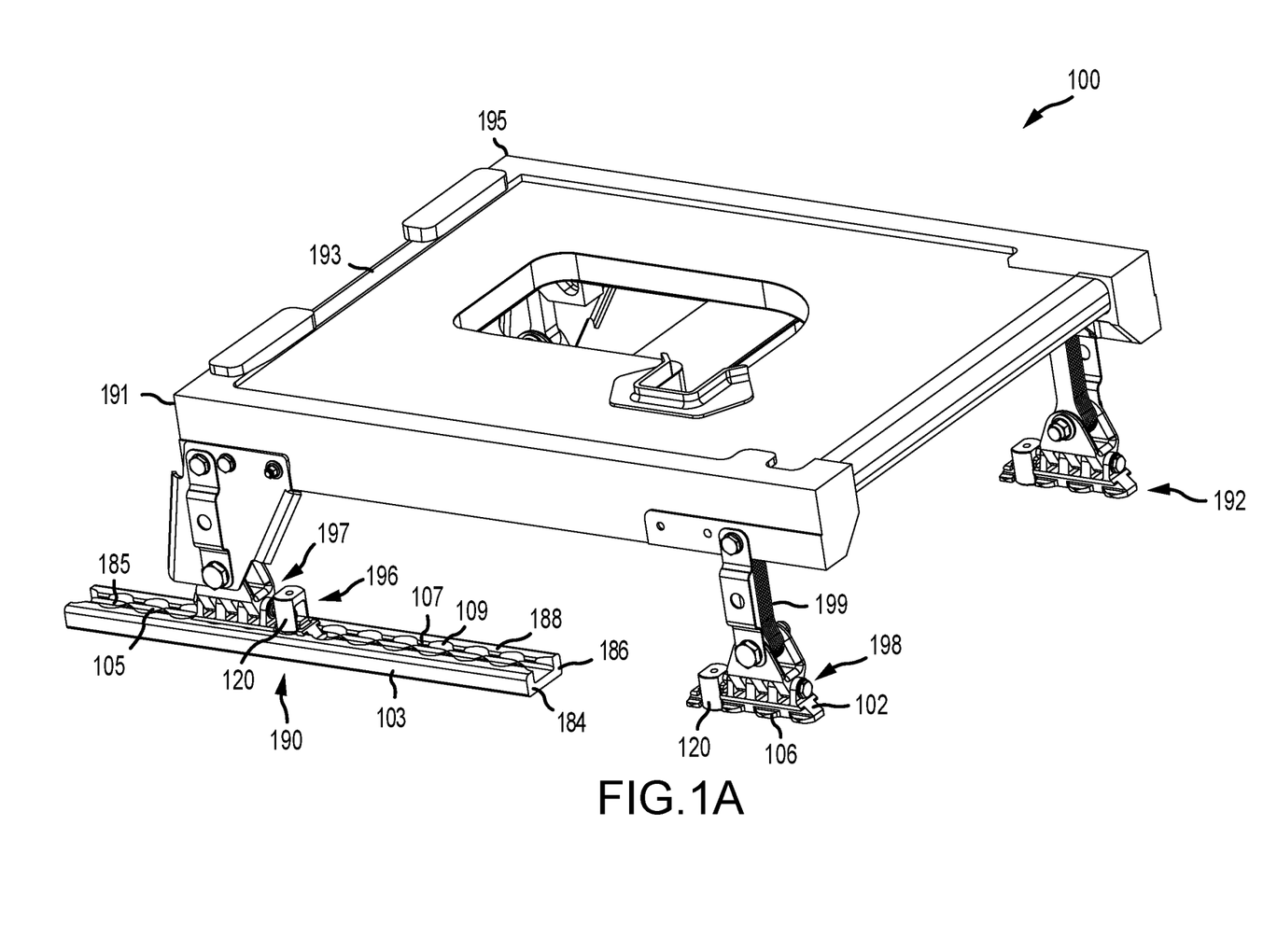
FIG. 1A is a perspective schematic view of a seat frame or base having a track and a track locking assembly, in accordance with various embodiments.

Referring now to the drawings, FIG. 1A schematically illustrates perspective view of a seat assembly 100 that may be used in an aircraft, a train, a bus or some other form of transportation. The seat assembly 100 is connected to a floor via a track assembly 190. In various embodiments, the seat assembly 100 includes the track assembly 190, a plurality of track foot assemblies 192 configured for slidable engagement with the track assembly 190, a seat frame 193 and a plurality of track lock assemblies 196. In various embodiments, the seat assembly 100 includes one of the plurality of track foot assemblies 192 and one of the plurality of track lock assemblies 196 positioned at each of four corners of the seat frame 193 that serve to releasably lock the seat frame 193 to the track assembly 190, which may comprise a first track 103 positioned on a first side 191 of the seat assembly 100 and a second track positioned on a second side 195 of the seat assembly 100.

In various embodiments, the first track 103 extends longitudinally along the floor of an aircraft and includes a base 184, a pair of opposing walls 186 and a pair of engagement members 188 extending inward from the pair of opposing walls 186. The base 184 is connected to the aircraft floor using suitable fasteners, such as bolts or flush head screws. The pair of opposing walls 186 extend upward from the base 184. Each wall within the pair of opposing walls 186 is spaced apart from the other and is disposed substantially parallel to the other along a length of the first track 103. The pair of engagement members 188 extend inwardly and toward one another from upper portions of the pair of opposing walls 186. The pair of engagement members 188 each include pluralities of regularly spaced lip portions 107 and recess portions 109. The base 184, the pair of opposing walls 186 and the pluralities of regularly spaced lip portions 107 and recess portions 109 define a slot 185. The slot 185 extends along the length of the first track 103. The pluralities of regularly spaced lip portions 107 and recess portions 109 further define a plurality of access openings 105. The plurality of access openings 105 are configured to receive a portion of one or more of the plurality of track foot assemblies 192, as described further below.

Each of a first track foot assembly 197 and a second track foot assembly 198 is at least partially received within the first track 103. For example, both the first track foot assembly 197 and the second track foot assembly 198 includes a track foot body 102 and a plurality of tabs 106. Each of the plurality of tabs 106 extend away from the track foot body 102. The plurality of tabs 106 are provided with a shape complementary to the plurality of access openings 105. Each of the plurality of tabs 106 extends through a corresponding one of the plurality of access openings 105. The plurality of tabs 106 are received within the slot 185 of the first track 103.

Each of the plurality of track foot assemblies 192 is connected to the seat frame 193 via a leg 199 (two different styles of leg are illustrated). The seat frame 193 is secured to the track assembly 190 by one or more of the plurality of track foot assemblies 192—e.g., the first track foot assembly 197 and the second track foot assembly 198 are secured to the first track 103. Each of the plurality of track lock assemblies 196 interfaces with the track assembly 190 and a respective one of the plurality of track foot assemblies 192 to clamp the respective one of the plurality of track foot assemblies 192 into the track assembly 190. Generally, and as explained further below, each one of the plurality of track lock assemblies 196 includes a plunger 120 configured to be received within one of the access openings 105. The plunger 120 prevents a respective one of the plurality of track foot assemblies 192 from sliding fore or aft within the track assembly 190. Details of the track lock assemblies are now described below, in accordance with various embodiments of the disclosure.

Figure 1B:
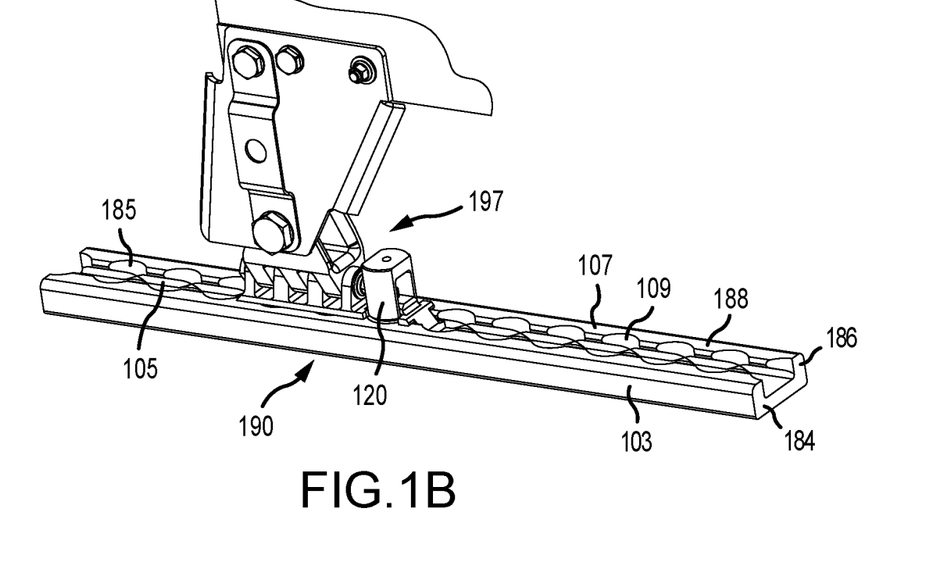
FIGS. 1B and 1C are close-up perspective views of the track locking assemblies illustrated in FIG. 1A, in accordance with various embodiments.
Figure 1C:
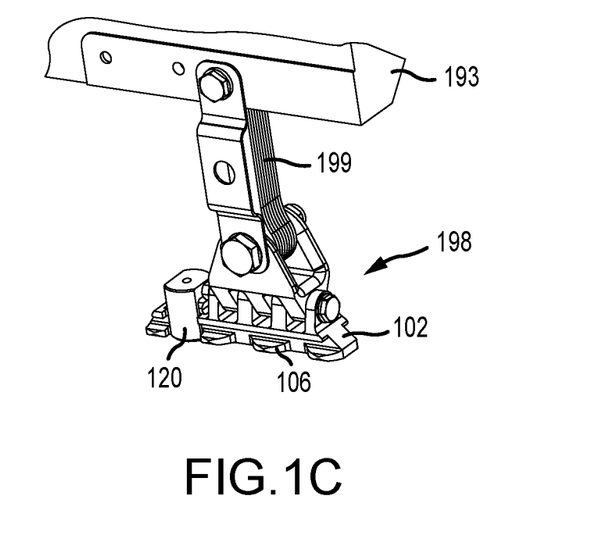
Figure 2A:
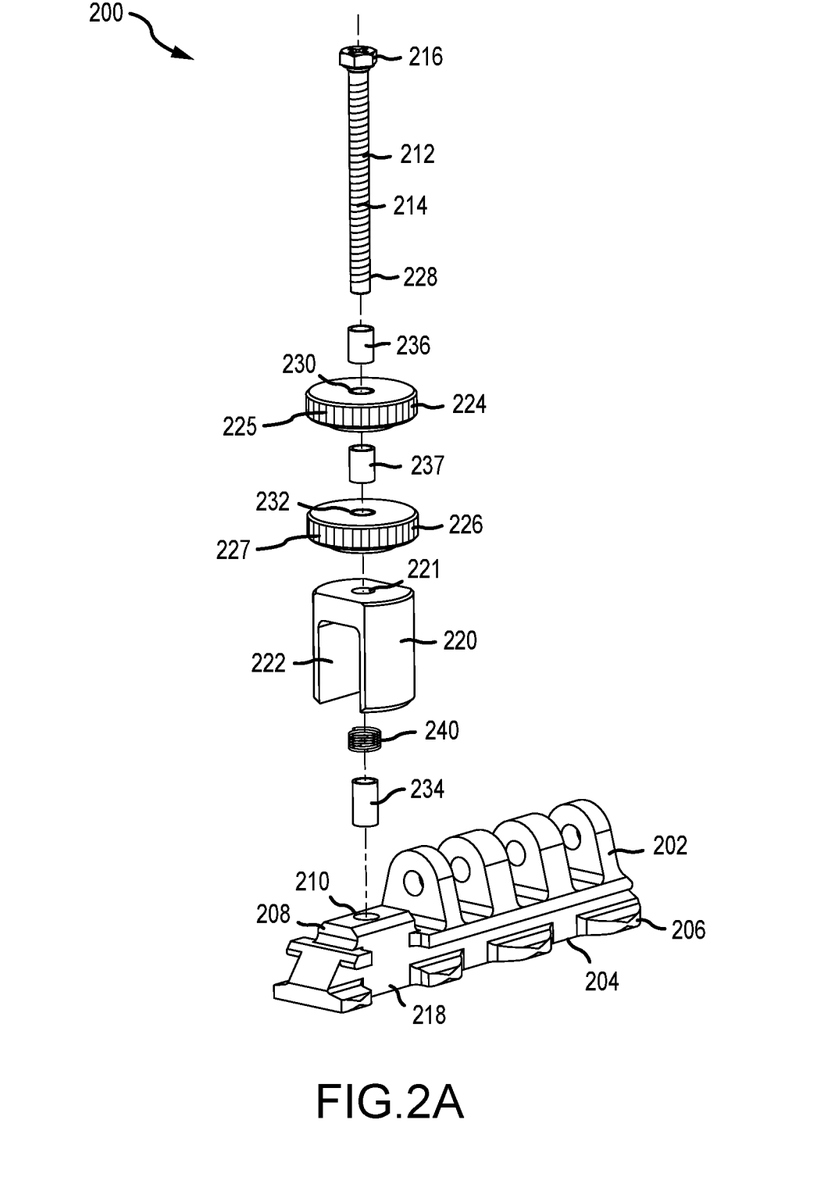
FIG. 2A is an exploded schematic view of a track locking assembly, in accordance with various embodiments.

An embodiment of the disclosure is now described with reference to FIGS. 2A-2E. Referring first to FIG. 2A, an exploded view of a track lock assembly 200 is illustrated in accordance with various embodiments. In various embodiments, the track lock assembly 200 is used as one of the plurality of track lock assemblies 196, described above with reference to FIGS. 1A-1C. The track lock assembly 200 includes a track foot body 202 for insertion into a track 203 (see FIGS. 2B-2E), such as the first track 103 illustrated above with reference to FIGS. 1A and 1B. The track foot body 202 includes a lower section 204 having a plurality of tabs 206 that are configured to pass through a plurality of access openings 205 formed in the track, such as the access openings 105 described above. The track foot body 202 further includes an anchor section 208 having an aperture 210. The aperture 210 is configured to receive a pin member 212, which in various embodiments has a threaded body 214 along its length and a grip portion 216 at its top. In various embodiments, the pin member 212 may be threaded into locking helical coil inserts positioned within the aperture 210 and be further prevented from loosening through use of a locking adhesive. The anchor section 208 further includes a pair of opposing side walls 218 that are generally flat-sided and configured to slidably receive a plunger 220. The plunger 220 includes a pair of inner side walls 222 that are configured to slidably engage the pair of opposing side walls 218 of the anchor section 208.

The track lock assembly 200 further includes a first nut 224 and a second nut 226, configured for threaded engagement with the threaded body 214 of the pin member 212. The first nut 224 and the second nut 226 may be hexagonal nuts, disk-like nuts, as illustrated, or other threaded components capable of being manipulated by an operator's fingers. In various embodiments, the aperture 210 may be threaded to receive a first end 228 of the pin member 212. Likewise, in various embodiments, the first nut 224 includes an interior portion 230 that is threaded and the second nut 226 includes an interior portion 232 that is threaded. As explained further below, the threads on the first nut 224 and the second nut 226 enable the nuts to traverse the length of the pin member 212 by rotating the nuts with respect to the pin member. In various embodiments, the aperture 210 is configured to receive a first threaded insert 234, such as a helical coil insert. Likewise, in various embodiments, the interior portion 230 of the first nut 224 is configured to receive an upper second threaded insert 236 and the interior portion 232 of the second nut 226 is configured to receive a lower second threaded insert 237 The first threaded insert 234 and the upper second threaded insert 236 and the lower second threaded insert 237 provide locking threads in the aperture 210 and the interior portions of the first nut 224 and the second nut 226. In various embodiments, a bias element, such as a coil spring 240, is positioned between the anchor section 208 and the plunger 220 and serves to bias the plunger 220 away from the anchor section 203.

The track lock assembly 200 is assembled as illustrated in FIG. 2A. Specifically, the first nut 224 is threaded onto the pin member 212, followed by the second nut 226. The first nut 224 and the second nut 226 are threaded toward the grip portion 216 at the top of the pin member 212. The plunger 220 is then slidably positioned on the pin member 212 by inserting the bottom of the pin member 212 through an aperture 221 at the top of the plunger 220. The coil spring 240 is then slid over the bottom of the pin member 212 and the bottom of the pin member 212 is threaded into the aperture 210 in the anchor section 208. In various embodiments, following the foregoing steps, assembly of the track lock assembly 200 is complete and the track foot body 202 is ready for locking deployment into the track 203. In various embodiments, one or both of the first nut 224 and the second nut 226 include a knurled surface (e.g., an upper knurled surface 225 and a lower knurled surface 227) to aid an operator in manipulating the nuts by hand during assembly or disassembly of the track lock assembly 200.

Referring now to FIGS. 2B-2E, a series of steps used to deploy and lock the track lock assembly 200 within the track 203 is described. Starting with FIG. 2B, the track foot body 202, having the various components above described installed thereto, is received within the track 203. The track foot body 202 is received within the track 203 by inserting the plurality of tabs 206 into the plurality of access openings 205. As seen from the discussion above with reference to FIGS. 1A-1C, the plurality of access openings 205 appears in regularly spaced intervals along the track 203 due to the configuration and spacing of a plurality of regularly spaced lip portions 207 and a plurality of regularly spaced recess portions 209. Following receipt of the track foot body 202 by the track 203, the track foot body 202 is translated along the track one-half a regularly spaced interval, such that the plurality of tabs 206 is positioned directly below and adjacent a subset of the plurality of regularly spaced lip portions 207. This orientation prevents the track foot body 202 from being removed (or upwardly withdrawn) from the track 203.

Figure 2B:
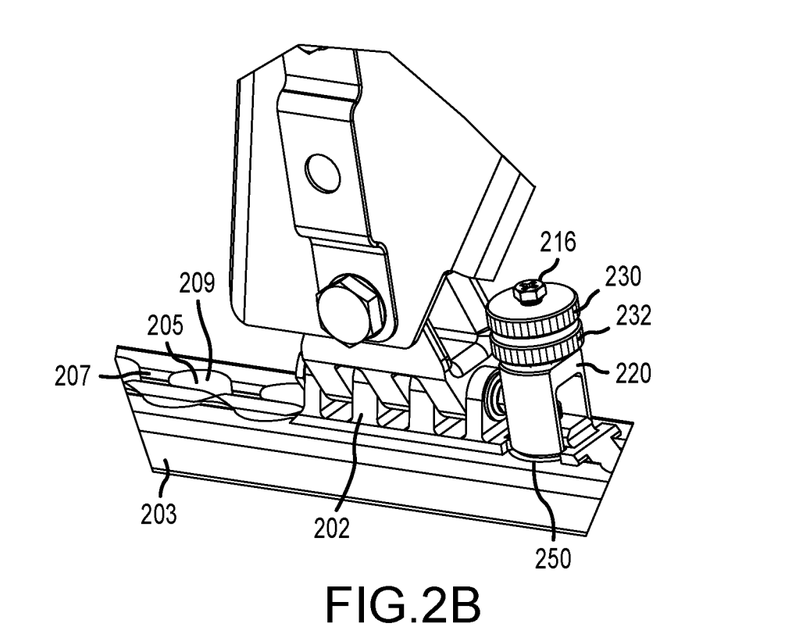
FIGS. 2B, 2C, 2D and 2E are schematic views of a series of steps used to lock the track locking assembly illustrated in FIG. 2A, in accordance with various embodiments.
Figure 2C:
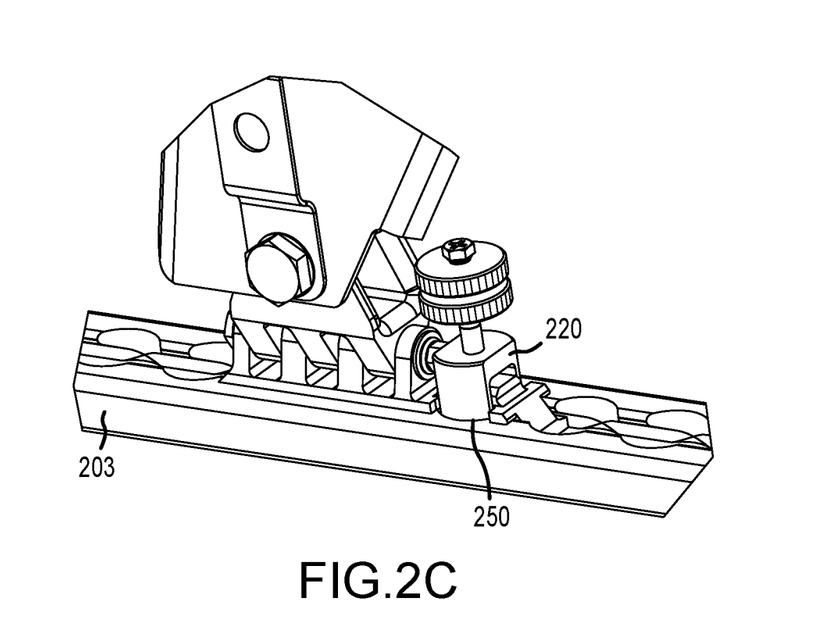
Figure 2D:
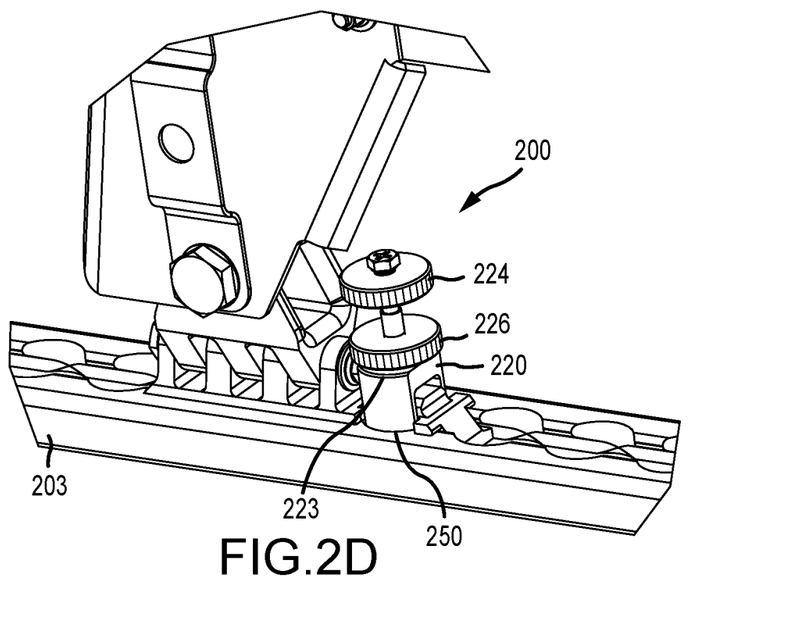
Figure 2E:
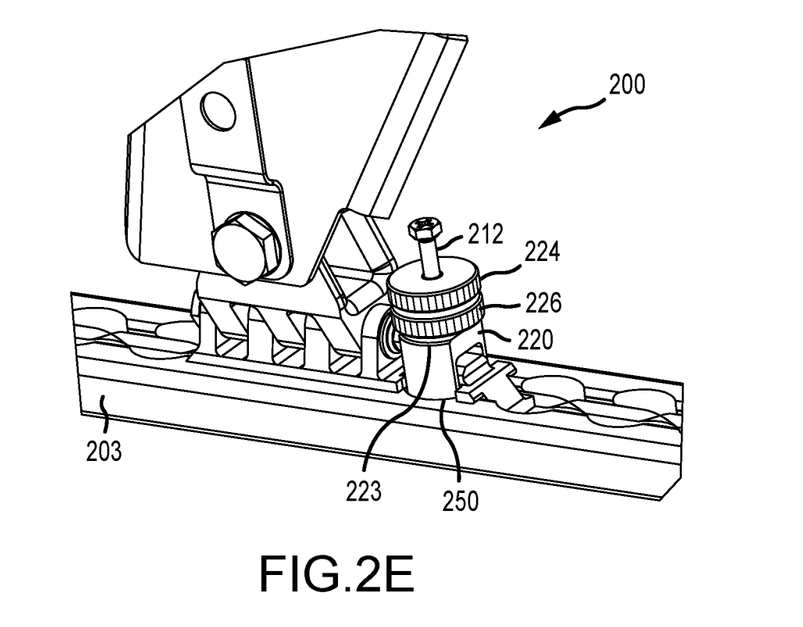

Referring to FIG. 2B, in the orientation just described, the plunger 220, which is positioned between a pair of tabs 206 (as illustrated in FIG. 2A), sits directly above a locking access opening 250, which is one of the plurality of access openings 205. Referring to FIG. 2C, the plunger 220 is urged into the locking access opening 250, against the bias provided by the coil spring 240. The plunger 220 may be urged into the locking access opening 250 by an operator pressing in a downward direction against the plunger 220. Referring to FIG. 2D, once the plunger 220 is fully urged into the locking access opening 250, the second nut 226 is threaded downward toward the plunger 220 until contacting an upper surface 223 of the plunger 220. In various embodiments, the second nut 226 is tightened sufficiently to bring the plurality of tabs 206 of track foot body 202 into contact with the plurality of regularly spaced lip portions 207 of the track 203, thereby minimizing or eliminating any looseness or movement between the track foot body 202 and the track 203. Contact of the second nut 226 against the upper surface 223 of the plunger 220 prevents the coil spring 240 from urging the plunger 220 back out of the locking access opening 250. Referring to FIG. 2E, the first nut 224 is now threaded downward toward the plunger 220 until contacting the second nut 226. The first nut 224 is tightened against the second nut 226 to serve as a jam nut, thereby preventing the second nut 226 from loosening over time due to vibration. Once positioned within the locking access opening 250, the plunger 220 prevents translation of the track foot body 202 along the track 203, thereby locking a seat frame, such as the seat frame 193 described above with reference to FIG. 1A, from translational movement and minimizing or eliminating looseness between the track 203 and the seat frame.

Figure 3A:
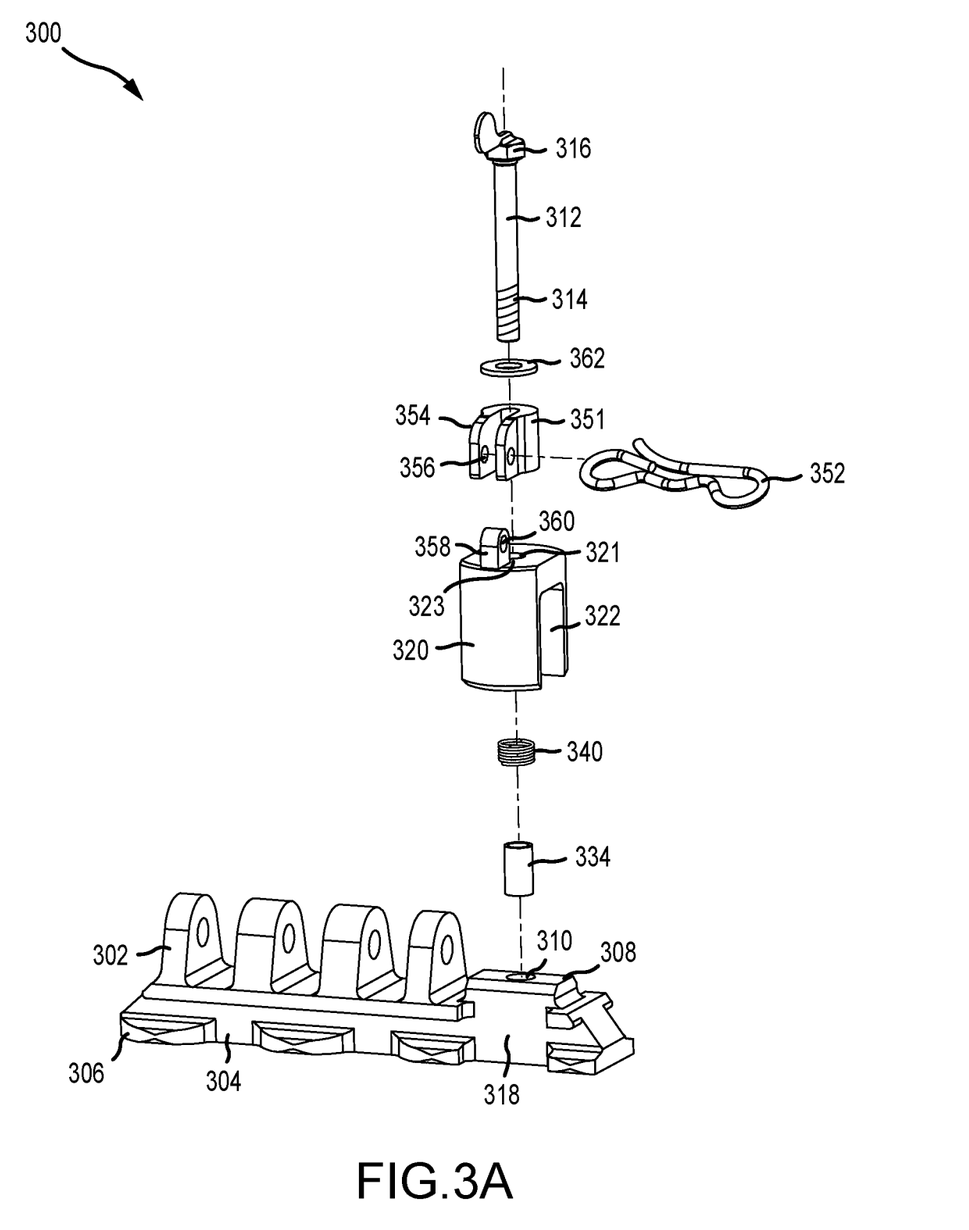
FIG. 3A is an exploded schematic view of a track locking assembly, in accordance with various embodiments.

An embodiment of the disclosure is now described with reference to FIGS. 3A-3D. Referring first to FIG. 3A, an exploded view of a track lock assembly 300 is illustrated in accordance with various embodiments. In various embodiments, the track lock assembly 300 is used as one of the plurality of track lock assemblies 196, described above with reference to FIGS. 1A-1C. The track lock assembly 300 includes a track foot body 302 for insertion into a track 303 (see FIGS. 3B-3D), such as the first track 103 illustrated above with reference to FIGS. 1A and 1B. The track foot body 302 includes a lower section 304 having a plurality of tabs 306 that are configured to pass through a plurality of access openings 305 formed in the track, such as the access openings 105 described above. The track foot body 302 further includes an anchor section 308 having an aperture 310. The aperture 310 is configured to receive a pin member 312, which in various embodiments has a threaded body 314 along at least a portion of its length and a grip portion 316 at its top. In various embodiments, the pin member 312 may be threaded into helical coil inserts positioned within the aperture 310 and be further prevented from loosening through use of a locking adhesive. The anchor section 308 further includes a pair of opposing side walls 318 that are generally flat-sided and configured to slidably receive a plunger 320. The plunger 320 includes a pair of inner side walls 322 that are configured to slidably engage the pair of opposing side walls 318 of the anchor section 308.

1 The track lock assembly 300 further includes a locking collar 351 and a retaining clip 352. The locking collar 351 includes a pair of opposing tabs 354, each tab having a first hole 356 extending there through. The pair of opposing tabs 354 are configured to sandwich a tab member 358 that protrudes from an upper surface 323 of the plunger 320. The tab member 358 includes a second hole 360 extending there through that is positioned to align with the first hole 356 extending through each of the pair of opposing tabs 354. The first hole 356 extending through each of the pair of opposing tabs 354 and the second hole 360 include a diameter that is sized to receive the retaining clip 352. In various embodiments, the aperture 310 is configured to receive a first threaded insert 334, such as a helical coil insert. In various embodiments, a bias element, such as a coil spring 340 is positioned between the anchor section 308 and the plunger 320 and serves to bias the plunger 320 away from the anchor section 308.

The track lock assembly 300 is assembled as illustrated in FIG. 3A. Specifically, the plunger 320 is slidably positioned on the pin member 312 by inserting the bottom of the pin member 312 through an aperture 321 at the top of the plunger 320. The coil spring 340 is then slid over the bottom of the pin member 312 and the bottom of the pin member 312 is threaded into the aperture 310 in the anchor section 308. The locking collar 351 may then be positioned about the pin member 312, in between the grip portion 316 and the upper surface 323 of the plunger 320. The first hole 356 extending through each of the pair of opposing tabs 354 and the second hole 360 are then aligned and the retaining clip 352 is inserted through the holes. In various embodiments, a washer 362 may also be positioned adjacent the grip portion 316 prior to assembly of the various components above described on the pin member 312. Following the foregoing steps, assembly of the track lock assembly 300 is complete and the track foot body 302 is ready for locking deployment into the track 303.

Figure 3B:
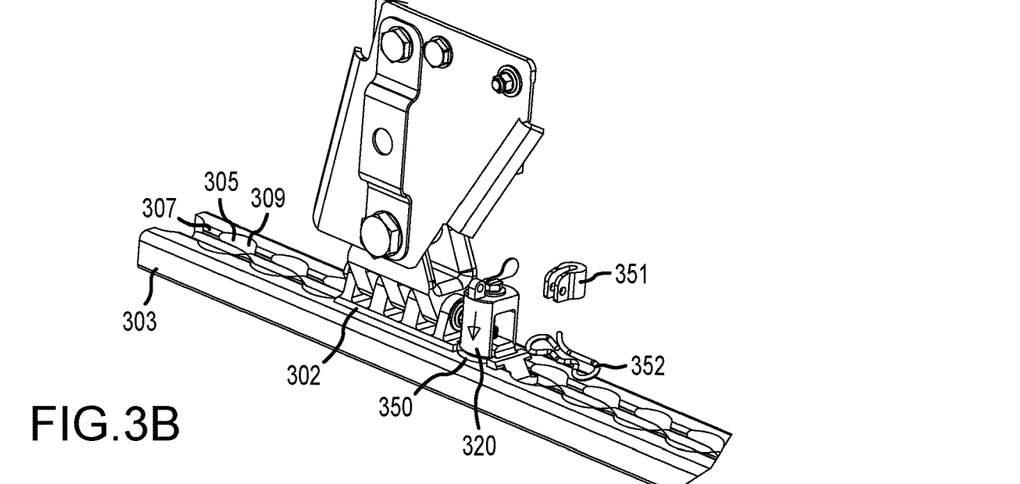
FIGS. 3B, 3C, and 3D are schematic views of a series of steps used to lock the track locking assembly illustrated in FIG. 3A, in accordance with various embodiments.
Figure 3C:
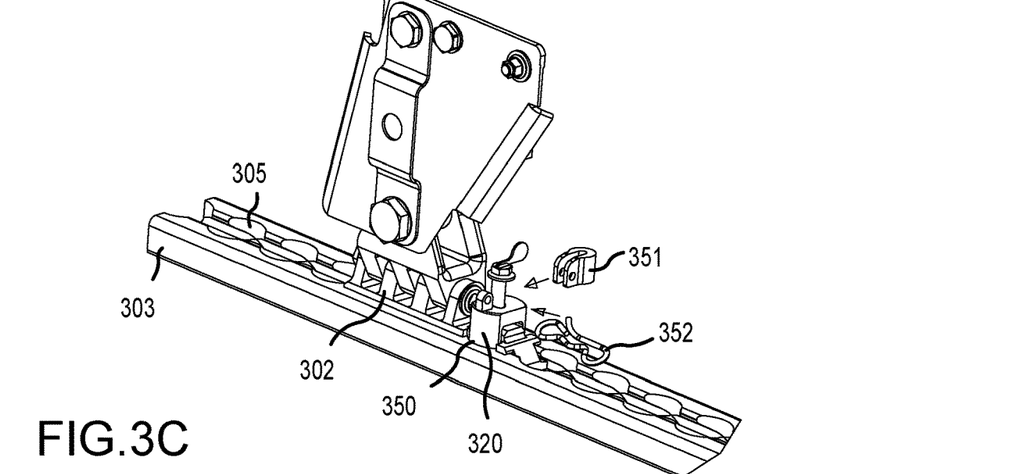
Figure 3D:
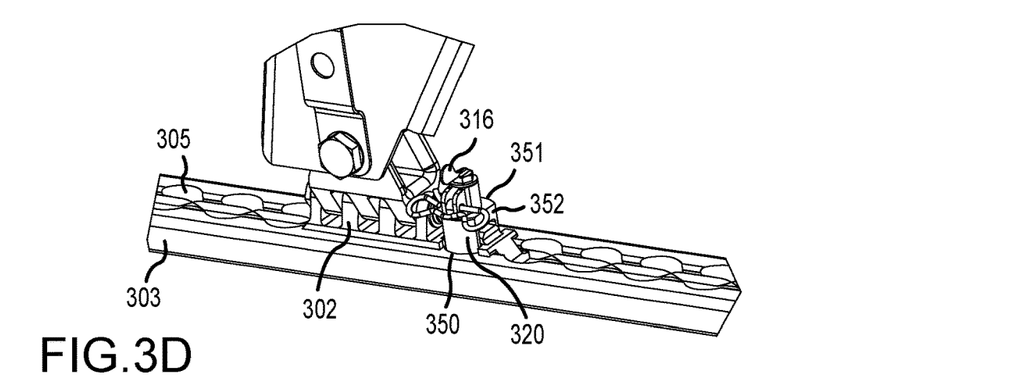

Referring now to FIGS. 3B-3D, a series of steps used to deploy and lock the track lock assembly 300 within the track 303 is described. Starting with FIG. 3B, the track foot body 302, with the locking collar 351 and retaining clip 352 briefly removed from the track lock assembly 300, is received within the track 303. The track foot body 302 is received within the track 303 by inserting the plurality of tabs 306 into the plurality of access openings 305. As seen from the discussion above with reference to FIGS. 1A-1C, the plurality of access openings 305 appears in regularly spaced intervals along the track 303 due to the configuration and spacing of a plurality of regularly spaced lip portions 307 and a plurality of regularly spaced recess portions 309. Following receipt of the track foot body 302 by the track 303, the track foot body 302 is translated along the track one-half a regularly spaced interval, such that the plurality of tabs 306 is positioned directly below and adjacent a subset of the plurality of regularly spaced lip portions 307. This orientation prevents the track foot body 302 from being removed (or upwardly withdrawn) from the track 303.

Referring to FIG. 3B, in the orientation just described, the plunger 320, which is positioned between a pair of tabs 306 (as illustrated in FIG. 3A), sits directly above a locking access opening 350, which is one of the plurality of access openings 305. Referring to FIG. 3C, the plunger 320 is urged into the locking access opening 350, against the bias provided by the coil spring 340. The plunger 320 may be urged into the locking access opening 350 by an operator simply pressing in a downward direction against the plunger 320. Referring to FIGS. 3C and 3D, once the plunger 320 is fully urged into the locking access opening 350, the locking collar 351 and retaining clip 352 are reassembled into the track lock assembly 300, locking the plunger 320 into place. The retaining clip 352 maintains the locking collar 351 in position in the presence of vibration. In various embodiments, the grip portion 316 may also be used to further tighten the pin member 312 against the locking collar 351 to prevent any rattling that might otherwise occur. Once positioned within the locking access opening 350, the plunger 320 prevents translation of the track foot body 302 along the track 303, thereby locking a seat frame, such as the seat frame 193 described above with reference to FIG. 1A, from translational movement.

Figure 4A:
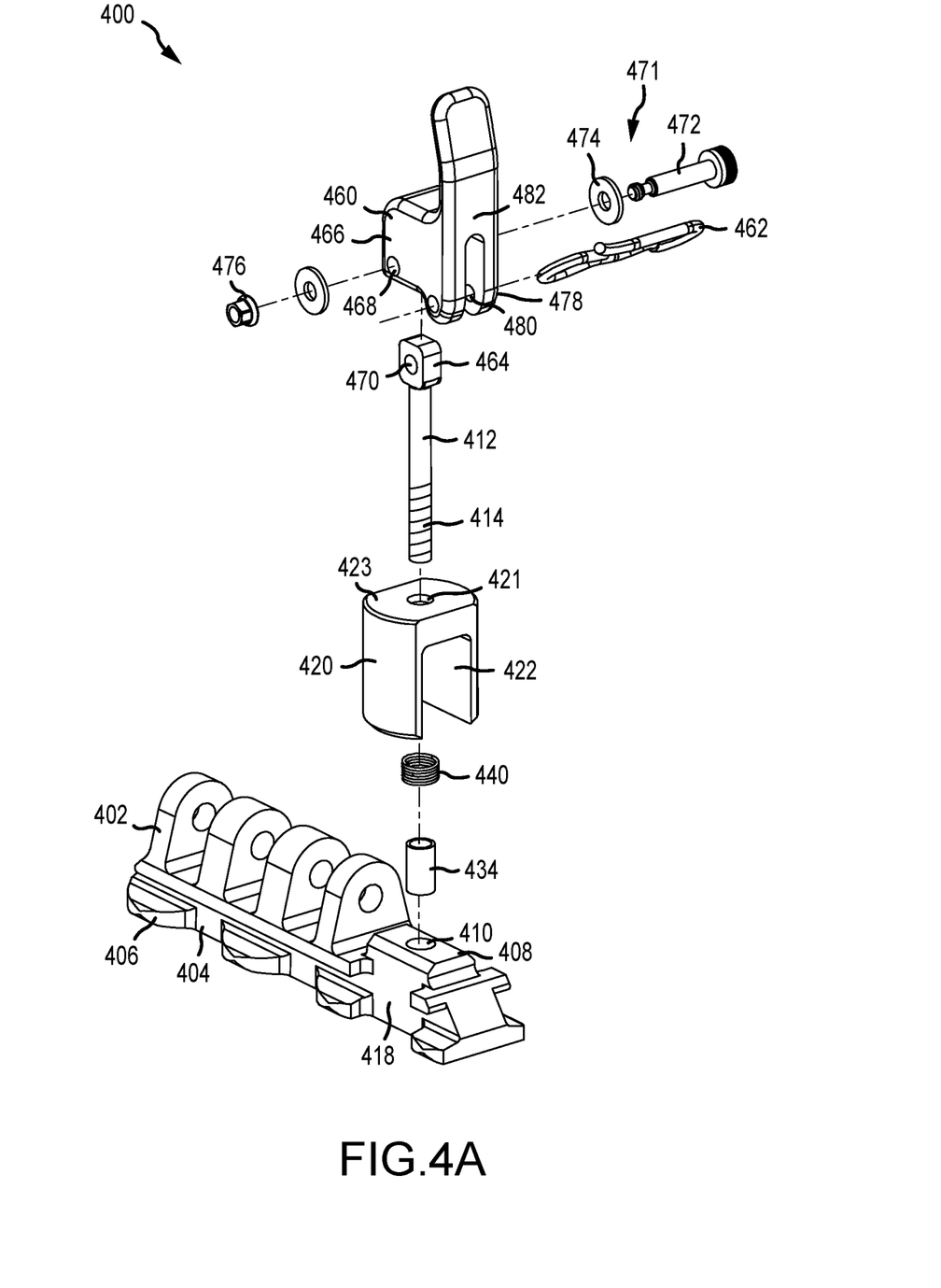
FIG. 4A is an exploded schematic view of a track locking assembly, in accordance with various embodiments.

An embodiment of the disclosure is now described with reference to FIGS. 4A-4D. Referring first to FIG. 4A, an exploded view of a track lock assembly 400 is illustrated in accordance with various embodiments. In various embodiments, the track lock assembly 400 is used as one of the plurality of track lock assemblies 196, described above with reference to FIGS. 1A-1C. The track lock assembly 400 includes a track foot body 402 for insertion into a track 403 (see FIGS. 4B-4D), such as the first track 103 illustrated above with reference to FIGS. 1A and 1B. The track foot body 402 includes a lower section 404 having a plurality of tabs 406 that are configured to pass through a plurality of access openings 405 formed in the track, such as the access openings 105 described above. The track foot body 402 further includes an anchor section 408 having an aperture 410. The aperture 410 is configured to receive a pin member 412, which in various embodiments has a threaded body 414 along at least a portion of its length. In various embodiments, the pin member 412 may be threaded into locking helical coil inserts positioned within the aperture 410 and be further prevented from loosening through use of a locking adhesive. The anchor section 408 further includes a pair of opposing side walls 418 that are generally flat-sided and configured to slidably receive a plunger 420. The plunger 420 includes a pair of inner side walls 422 that are configured to slidably engage the pair of opposing side walls 418 of the anchor section 408.

Figure 4B:
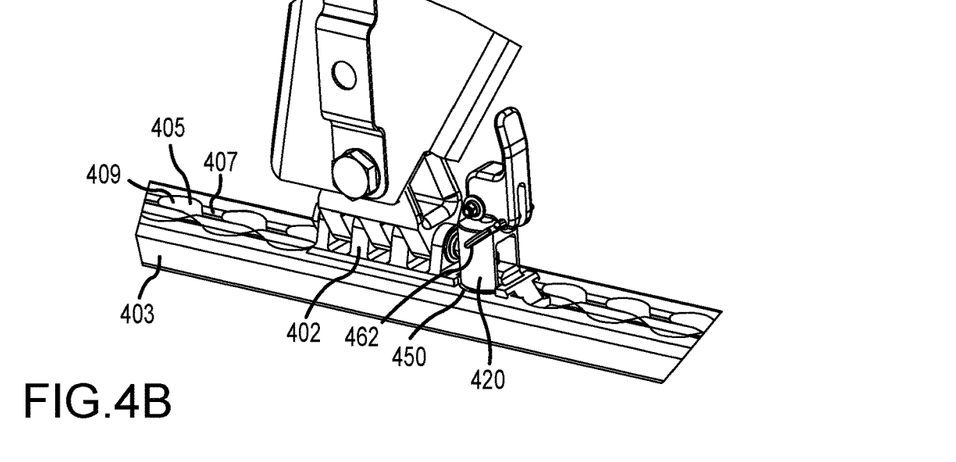
FIGS. 4B, 4C and 4D are schematic views of a series of steps used to lock the track locking assembly illustrated in FIG. 4A, in accordance with various embodiments.
Figure 4C:
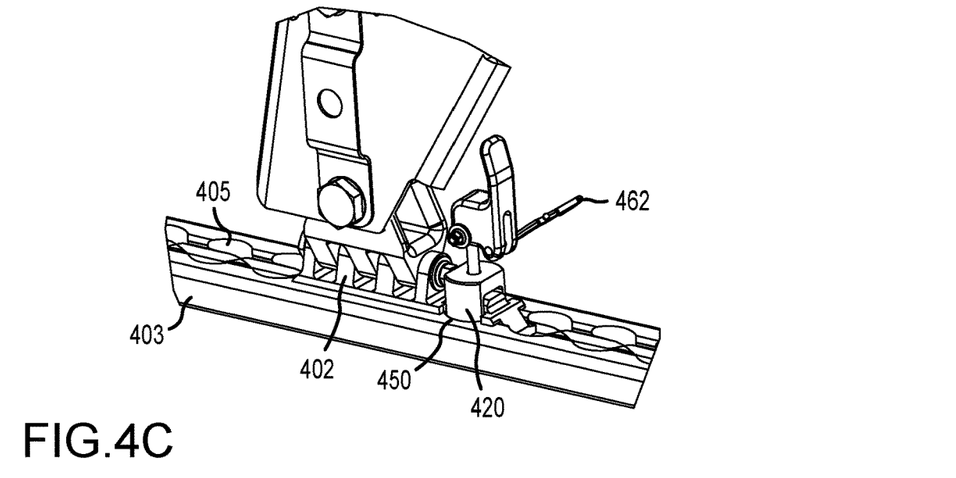
Figure 4D:
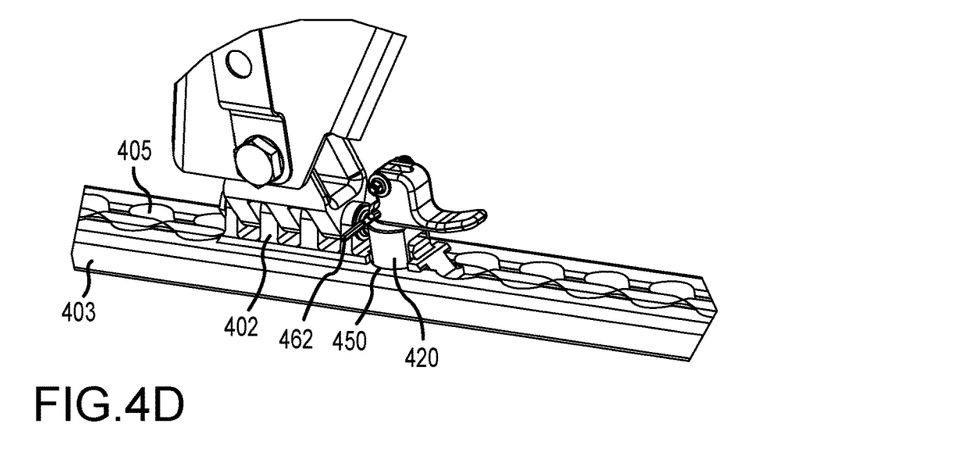

The track lock assembly 400 further includes a cam member 460 and a retaining clip 462. The cam member 460 is pivotally mounted to a tab member 464 positioned on top of the pin member 412. The cam member 460 includes a pair of opposing tabs 466, each tab having a first hole 468 extending there through. The pair of opposing tabs 466 are configured to sandwich the tab member 464, which includes a second hole 470 extending there through that is positioned to align with the first hole 468 extending through each of the pair of opposing tabs 466. A pivot assembly 471, which includes a pin 472, a pair of washers 474 and a nut 476 sized to thread onto the pin 472, is used to secure the cam member 460 to the tab member 464, such that the cam member 460 may pivot about the tab member 464. The cam member 460 further includes a second pair of opposing tabs 478, each tab having a third hole 480 extending there through. The second pair of opposing tabs 478 and the retaining clip 462, when extending through each third hole 480, are configured to secure the cam member 460 in a locked position as described further below. The cam member 460 further includes a locking face 482 that is offset a distance from the first hole 468 in each of the pair of opposing tabs 466 in order to provide a downward push to the plunger 420 when the cam member 460 is rotated from an upright position, as illustrated in FIGS. 4B and 4C, to a downward position, as illustrated in FIG. 4D. In various embodiments, the aperture 410 is configured to receive a first threaded insert 434, such as a helical coil insert. In various embodiments, a bias element, such as a coil spring 440 is positioned between the anchor section 408 and the plunger 420 and serves to bias the plunger 420 away from the anchor section 408 when the cam member 460 is unlocked.

The track lock assembly 400 is assembled as illustrated in FIG. 4A. Specifically, the plunger 420 is slidably positioned on the pin member 412 by inserting the threaded body 414 of the pin member 412 through an aperture 421 at the top of the plunger 420. The coil spring 440 is then slid over the threaded body 414 of the pin member 412 and the threaded body 414 of the pin member 412 is threaded into the aperture 410 in the anchor section 408. The cam member 460 is then pivotally attached to the tab member 464 using the pivot assembly 471. The retaining clip 462 may also be inserted through the third hole 480 of each of the second pair of opposing tabs 478. Following the foregoing steps, assembly of the track lock assembly 400 is complete and the track foot body 402 is ready for locking deployment into the track 403.

Referring now to FIGS. 4B-4D, a series of steps used to deploy and lock the track lock assembly 400 within the track 403 is described. Starting with FIG. 4B, the track foot body 402, with the cam member 460 in an upright and unlocked position, is received within the track 403. The track toot body 402 is received within the track 403 by inserting the plurality of tabs 406 into the plurality of access openings 405. As seen from the discussion above with reference to FIGS. 1A-1C, the plurality of access openings 405 appears in regularly spaced intervals along the track 403 due to the configuration and spacing of a plurality of regularly spaced lip portions 407 and a plurality of regularly spaced recess portions 409. Following receipt of the track foot body 402 by the track 403, the track foot body 402 is translated along the track one-half a regularly spaced interval, such that the plurality of tabs 406 is positioned directly below and adjacent a subset of the plurality of regularly spaced lip portions 407. This orientation prevents the track foot body 402 from being removed (or upwardly withdrawn) from the track 403.

Referring to FIG. 4B, in the orientation just described, the plunger 420, which is positioned between a pair of tabs 406 (as illustrated in FIG. 4A), sits directly above a locking access opening 450, which is one of the plurality of access openings 405. Referring to FIG. 4C, the plunger 420 is urged into the locking access opening 450, against the bias provided by the coil spring 440. The retaining clip 462 is then removed from the cam member 460 and the plunger 420 is urged into the locking access opening 450 by an operator simply pressing in a downward direction against the plunger 420. Referring to FIGS. 4C and 4D, once the plunger 420 is fully urged into the locking access opening 450, the cam member 460 is rotated downward, such that the locking face 482 rests against an upper surface 423 of the plunger 420, thereby maintaining the plunger 420 in position within the locking access opening 450. The retaining clip 462 is then reinstalled, preventing the cam member 460 from rotating back to an upward position by action of the retaining clip 462 being blocked by the shaft of the pin member 412. Once positioned within the locking access opening 450, the plunger 420 prevents translation of the track foot body 402 along the track 403, thereby locking a seat frame, such as the seat frame 193 described above with reference to FIG. 1A, from translational movement.

Finally, it should be understood that any of the above described concepts can be used alone or in combination with any or all of the other above described concepts. Although various embodiments have been disclosed and described, one of ordinary skill in this art would recognize that certain modifications would come within the scope of this disclosure. Accordingly, the description is not intended to be exhaustive or to limit the principles described or illustrated herein to any precise form. Many modifications and variations are possible in light of the above teaching. Further, throughout the present disclosure, like reference numbers denote like elements. Accordingly, elements with element numbering may be shown in the figures, but may not necessarily be repeated herein for the sake of clarity.

Benefits, other advantages, and solutions to problems have been described herein with regard to specific embodiments. Furthermore, the connecting lines shown in the various figures contained herein are intended to represent exemplary functional relationships and/or physical couplings between the various elements. It should be noted that many alternative or additional functional relationships or physical connections may be present in a practical system. However, the benefits, advantages, solutions to problems, and any elements that may cause any benefit, advantage, or solution to occur or become more pronounced are not to be construed as critical, required, or essential features or elements of the disclosure. The scope of the disclosure is accordingly to be limited by nothing other than the appended claims, in which reference to an element in the singular is not intended to mean "one and only one" unless explicitly so stated, but rather "one or more." Moreover, where a phrase similar to "at least one of A, B, or C" is used in the claims, it is intended that the phrase be interpreted to mean that A alone may be present in an embodiment, B alone may be present in an embodiment, C alone may be present in an embodiment, or that any combination of the elements A, B and C may be present in a single embodiment; for example, A and B, A and C, B and C, or A and B and C. Different cross-hatching is used throughout the figures to denote different parts but not necessarily to denote the same or different materials.

Systems, methods and apparatus are provided herein. In the detailed description herein, references to "one embodiment", "an embodiment", "various embodiments", etc., indicate that the embodiment described may include a particular feature, structure, or characteristic, but every embodiment may not necessarily include the particular feature, structure, or characteristic. Moreover, such phrases are not necessarily referring to the same embodiment. Further, when a particular feature, structure, or characteristic is described in connection with an embodiment, it is submitted that it is within the knowledge of one skilled in the art to affect such feature, structure, or characteristic in connection with other embodiments whether or not explicitly described. After reading the description, it will be apparent to one skilled in the relevant art(s) how to implement the disclosure in alternative embodiments.

Furthermore, no element, component, or method step in the present disclosure is intended to be dedicated to the public regardless of whether the element, component, or method step is explicitly recited in the claims. No claim element herein is to be construed under the provisions of 35 U.S.C. 112(f) unless the element is expressly recited using the phrase "means for." As used herein, the terms "comprises", "comprising", or any other variation thereof, are intended to cover a non-exclusive inclusion, such that a process, method, article, or apparatus that comprises a list of elements does not include only those elements but may include other elements not expressly listed or inherent to such process, method, article, or apparatus.

What is claimed is:

1. A seat assembly, comprising:
    a seat frame;
    a track having a plurality of access openings; and
    a track lock assembly slidably connecting the seat frame to the track, the track lock assembly comprising:
        a track foot body configured for sliding translation within the track,
        a pin member having a first end configured for threaded engagement with the track foot body and a grip member disposed at a second end,
        a plunger configured for sliding engagement with the pin member between the first end and the second end and for locking engagement with the track lock assembly, a first nut threaded onto the pin member and configured to lock the plunger into one of the plurality of access openings and a second nut threaded onto the pin member and configured to jam lock the first nut, wherein the first nut and the second nut include a knurled surface configured for threading both the first nut and the second nut along the pin member by hand.

2. The seat assembly of claim 1, wherein the track foot body includes an anchor section configured to slidably receive the plunger and an aperture configured to receive the first end of the pin member.

3. The seat assembly of claim 2, wherein the first end of the pin member is threaded into the anchor section of the track foot body.

4. The seat assembly of claim 3, wherein the track lock assembly further comprises a bias element positioned between the anchor section and the plunger, the bias element configured to urge the plunger away from the anchor section.

5. The seat assembly of claim 4, wherein the bias element is a coil spring and wherein the pin member extends through a center of the coil spring.

6. A track lock assembly configured to secure a seat frame to a track, comprising:

a track foot body;

a pin member having a first end secured to the track foot body and a second end extending away from the track foot body, the pin member having a grip member disposed at the second end;

a plunger slidably engaged with the pin member between the first end and the second end, the plunger having a cut out portion defining a first pair of opposing walls configured to slidably engage the track foot body;

a first nut threaded onto the pin member and configured to lock the plunger into one of a plurality of access openings disposed within the track; and a second nut threaded onto the pin member and configured to jam lock the first nut, wherein the first nut and the second nut include a knurled surface configured for threading both the first nut and the second nut along the pin member by hand.

7. The track lock assembly of claim 6, wherein the first end of the pin member is threadedly engaged with the track foot body.

8. The track lock assembly of claim 7, further comprising a coil spring disposed between the track foot body and the plunger.

* * * * *

UNITED STATES PATENT AND TRADEMARK OFFICE
CERTIFICATE OF CORRECTION

PATENT NO. : 10,787,263 B2
APPLICATION NO. : 15/926144
DATED : September 29, 2020
INVENTOR(S) : Rob Jacobson Page 1 of 1

It is certified that error appears in the above-identified patent and that said Letters Patent is hereby corrected as shown below:

On the Title Page

In the Assignee field, please insert after GOODRICH the term --CORPORATION--

Signed and Sealed this
Second Day of March, 2021

Drew Hirshfeld
*Performing the Functions and Duties of the
Under Secretary of Commerce for Intellectual Property and
Director of the United States Patent and Trademark Office*